(12) United States Patent
Elvestad

(10) Patent No.: US 8,830,786 B1
(45) Date of Patent: Sep. 9, 2014

(54) FLUID DISTRIBUTION DEVICE

(71) Applicant: PGS Geophysical AS, Lysaker (NO)

(72) Inventor: Karl Petter Elvestad, Trogstad (NO)

(73) Assignee: PGS Geophysical AS, Oslo (NO)

( * ) Notice: Subject to any disclaimer, the term of this patent is extended or adjusted under 35 U.S.C. 154(b) by 61 days.

(21) Appl. No.: 13/831,068

(22) Filed: Mar. 14, 2013

(51) Int. Cl.
*G01V 1/137* (2006.01)

(52) U.S. Cl.
USPC .............................. 367/20; 367/144; 367/153

(58) Field of Classification Search
USPC ............................................ 367/20, 144, 153
See application file for complete search history.

(56) References Cited

U.S. PATENT DOCUMENTS

| | | | | |
|---|---|---|---|---|
| 4,715,023 A | * | 12/1987 | Otto | 367/144 |
| 4,757,482 A | * | 7/1988 | Fiske, Jr. | 367/144 |
| 4,858,205 A | * | 8/1989 | Harrison | 367/144 |
| 5,680,989 A | * | 10/1997 | Plachy et al. | 239/193 |
| 6,185,156 B1 | * | 2/2001 | Bouyoucos | 367/144 |
| 6,376,767 B1 | * | 4/2002 | Knudsen et al. | 174/47 |
| 2011/0149681 A1 | | 6/2011 | Hovland et al. | |
| 2011/0286303 A1 | | 11/2011 | Paull et al. | |

OTHER PUBLICATIONS

Bennex supplies subsea technology to the oil and gas industry, Offshore, http://offshore-mag.com/content/os/en/articles/print/volume-71/issue-3/Bergen-NCE-Subsea/bennex-supplies-subsea-technology-to-the-oil-and-gas-industry. html, 3 pages. [Retrieved Mar. 11, 2013].

* cited by examiner

*Primary Examiner* — Mark Hellner

(57) ABSTRACT

Techniques are disclosed herein relating to distribution of fluids. These techniques may be useful in, for example, supplying pressurized air to seismic sources (or arrays of seismic sources), such as those used in marine seismic operations. Some embodiments of this disclosure include a pipe that passes through a fluid distribution block. The pipe may be configured such that it is able to slide along and/or twist about a longitudinal axis of the distribution block. This technique may reduce the effects of the various stresses that may operate on marine seismic source equipment as it is towed through a body of water.

21 Claims, 3 Drawing Sheets

FLUID DISTRIBUTION DEVICE

BACKGROUND

Typically in seismic surveying, energy is generated (e.g., through the use of air guns) and sent into the earth. Some of this energy is reflected back to recording sensors. This data is subsequently processed using specialized seismic data processing to generate a visual image or other data representation of the seismic survey area. Seismic surveys are conducted for a variety of reasons; they may, in some embodiments, be used for assessing where minerals and/or petroleum deposits are located.

Marine seismic surveying is typically performed by towing one or more arrays of seismic energy sources behind a survey vessel. A plurality of seismic sensor cables (e.g., seismic streamers) may also be towed by the survey vessel (or a separate vessel) at laterally spaced apart locations with respect to the center line of the survey vessel.

The source arrays may be coupled to the survey vessel by an "umbilical cable," which provides axial strength to tow the source arrays, electrical signal conductors to actuate the individual sources and, when the seismic sources are air guns, for example compressed air lines to charge the guns between actuations.

To absorb some of the flexural motion that may be applied to an seismic source array, various portions of the array structure may include flexural sections. The flexural sections may include a tow wire, chain, cable, or similar structure to transmit axial loading and a bend restrictor to stiffen/control the flexibility. One difficulty with some embodiments of seismic source arrays is bend fatigue at the connections between flexural sections and the adjacent stiff section components, and fatigue in the stiff section components themselves.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Certain structural elements may be described herein as "configured to" or "operable to" perform one or more tasks. As used herein, these terms mean that a particular piece of hardware (in conjunction with software, in some cases) is arranged to perform a particular task or tasks when operated. Thus, a system that is "configured to" perform task A means that the system includes hardware that, during operation of the system, performs or can be used to perform task A. As such, a system can be said to be "configured to" perform task A even if the system is not currently operating. Further, certain elements may be described as "coupled" to one another. As used herein, this term includes a connection between components, whether direct or indirect.

DETAILED DESCRIPTION

Figure 1:
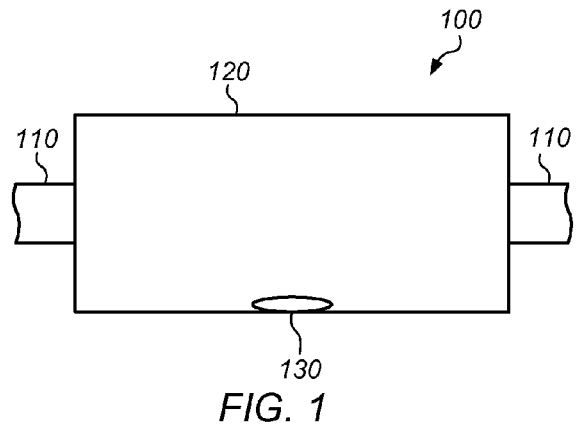
FIG. 1 is a block diagram illustrating one embodiment of a distribution block and pipe.

Turning now to FIG. 1, a block diagram of one embodiment of this disclosure is shown. As illustrated, system 100 includes distribution block 120, pipe 110, and outlet bore 130. In some embodiments, pipe 110 may be referred to as a distribution pipe or a distribution conduit. In one embodiment, system 100 represents an apparatus for gas or liquid distribution (generally referred to as fluid distribution). In various embodiments, pipe 110 receives a fluid, which is subsequently delivered to outlet bore 130. As such, distribution block 120 is used to receive the fluid and redirect it through outlet bore 130. Outlet bore 130 may in some embodiments include a suitable fitting (not shown) for connection to a device operable to receive such fluid. In various embodiments, outlet bore 130 is not limited to one bore but may instead be multiple bores. Outlet bore 130 may be connected to any fitting, block or other connecting or distribution device.

In one embodiment, outlet bore 130 is used as a conduit through which air is distributed to a seismic source (not shown) that may be attached to distribution block 120. In some embodiments, the seismic source may be disposed vertically below distribution block 120 to allow downward propagation of energy for purposes of seismic surveying.

Additionally, in various embodiments, pipe 110 and distribution block 120 may be constructed such that pipe 110 can twist and slide within distribution block 120. Such an arrangement may be referred to as pipe 110 being a "floating" pipe. The use of "floating" in such a context means that pipe 110 is configured to slide along a longitudinal axis of a cavity in distribution block 120 and/or to twist about such a longitudinal axis, without compromising operation of system 100. For example, this may include the ability of pipe 110 to carry out such motions while retaining a fluid seal within distribution block 120. In some embodiments, system 100 may receive a fluid from a high-pressure fluid supply on one side of pipe 110, redirect a portion thereof through outlet bore 130, and provide the remainder thereof via the other side of pipe 110. The remainder may in some embodiments then flow to additional systems similar to system 100. Accordingly, a plurality of distribution blocks 120 may be connected in series to a fluid supply.

In various embodiments, a seismic source array (e.g., an array of air guns or marine vibrators) may include a plurality of fluid distribution components such as system 100. For example, system 100 may be mounted inside a suspension structure (shown in FIG. 5 below) and the suspension structure may be part of the seismic source array. Such an array may include a separate portion of the suspension structure corresponding to system 100 for each seismic source. Such a seismic source array may be used for marine seismic surveying tasks that may be performed by towing one or more arrays of seismic sources behind a survey vessel. In various embodiments, this seismic source array may be operated at a selected depth in a body of water (e.g., a lake or the ocean).

With regard to a seismic source array, in various embodiments, such an array may typically include various components such as air guns, marine vibrators, compressed air lines to charge the seismic sources, suspension structures, and cables (discussed further with regards to FIGS. 4 and 5 below). When a seismic source array is towed in water behind a survey vessel, the array is typically subjected to various forces that may cause corresponding movement and/or deformation in the array (e.g., flexural motion). As such, in certain embodiments, the seismic source array may be constructed such that its structure is flexible or semi-flexible (e.g. by including flexible members interspersed with rigid members). This arrangement may allow the array to accept such forces without causing breakages. However, this flexible or semi-flexible structure may also allow the elements in the array to stretch and twist (i.e., the cables and air hoses). If a rigid air distribution apparatus is used in such an array, the air distribution apparatus may become inoperable (e.g., the air distribution apparatus may fail if it is twisted or stretched too far, or if it experiences smaller, but repeated stresses).

Accordingly, it may be desirable to employ a structure that allows a fluid distribution apparatus to function despite a twisted or stretched air line. In various embodiments, pipe 110 within distribution block 120 may twist about its longitudinal axis and/or slide along that axis with respect to distribution block 120 without impacting the functionality of system 100. Various embodiments of arrangements for achieving such functionality are described below.

Figure 2:
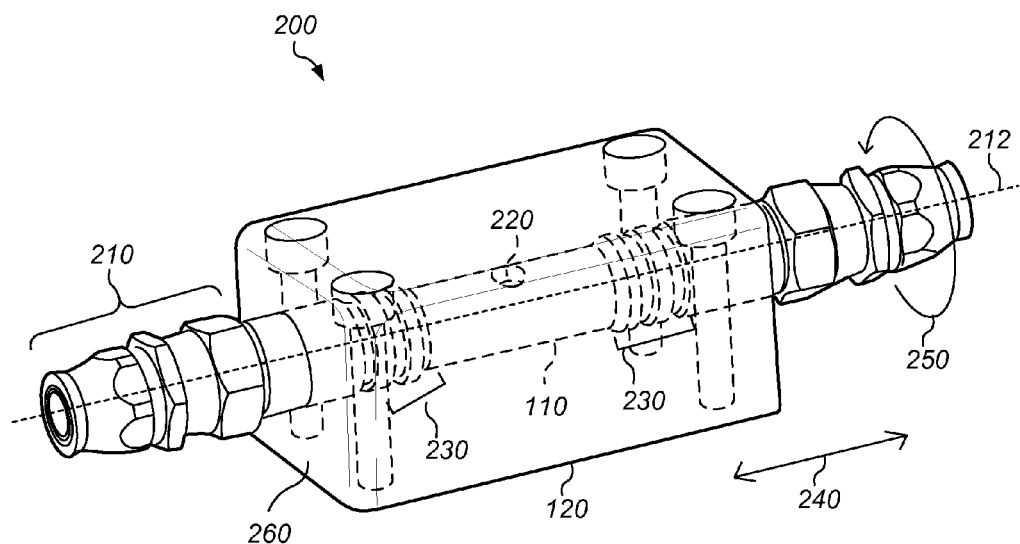
FIG. 2 is a block diagram illustrating one embodiment of a pipe within a distribution block.

Turning now to FIG. 2, a diagram illustrating another embodiment of this disclosure is shown. As illustrated, system 200 includes distribution block 120, pipe fittings 210, and pipe 110. In various embodiments, distribution block 120 is not limited to stand alone units as illustrated and may instead by integrated with additional units such as pressure sensors, valves, controllers, etc.

As illustrated, pipe 110 passes through a cavity in distribution block 120, which is centered on longitudinal axis 212. In various embodiments, pipe 110 may be coupled on one end through pipe fitting 210 to a hose (not shown) that delivers air or any other acceptable fluid. In one embodiment, pipe fittings 210 may be coupled with respective air hoses. The air hoses may be used to deliver compressed air to pipe 110 and ultimately to a seismic source through a bore in distribution block 120 (e.g., outlet bore 130). As illustrated, a portion of pipe 110 is located within distribution block 120. As depicted, distribution block 120 contains a hollow cavity through which pipe 110 passes.

As illustrated, pipe 110 may slide in a lateral motion 240 along longitudinal axis 212 and/or in a twisting motion 250 about longitudinal axis 212. In various embodiments, pipe 110 twists and slides independently of and within distribution block 120. In one embodiment, the distance that pipe 110 may travel when sliding in lateral motion 240 is limited by pipe fittings 210. In other words, pipe 110 can slide in lateral motion 240 until one of pipe fittings 210 comes into contact with distribution block wall 260. At this point, pipe 110 would be unable to slide any farther because it is coupled to pipe fitting 210, and the cross-section (e.g., diameter) of pipe fitting 210 would not allow it to slide into the opening in distribution block 120 (e.g., the diameter of pipe fitting 210 is larger than the diameter of the opening in distribution block 120 within which pipe 110 is placed). In various embodiments, the lateral motion 240 of pipe 110 may be restricted through other means. In one exemplary embodiment, the ends of pipe 110 may be constructed such that their diameter is greater than the diameter of the opening in distribution block 120.

As further illustrated, pipe 110 may have aperture 220 drilled into it, via which fluid may exit pipe 110. In some embodiments, the lateral motion of pipe 110 may be restricted (e.g., via pipe fittings 210) such that aperture 220 is not able to move outside of the cavity in distribution block 120.

Figure 3:
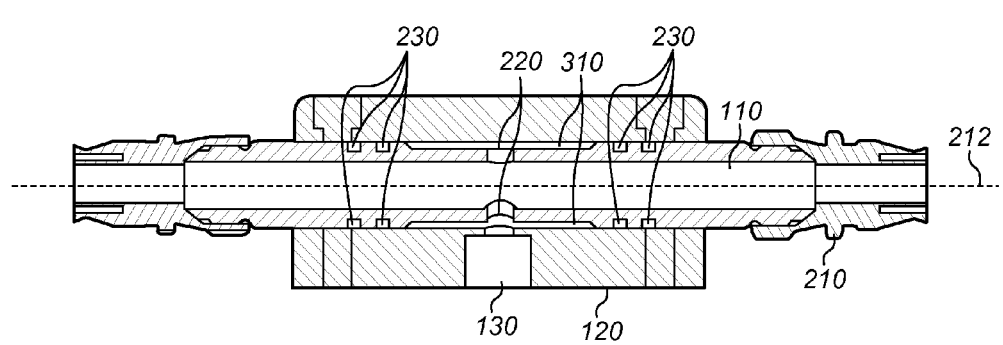
FIG. 3 is a cross-sectional view of a pipe within a distribution block

As will become apparent with regard to FIG. 3, the cross-section of a portion of the cavity of distribution block 120 is somewhat larger than the cross-section of pipe 110. As such, fluid may escape into a chamber formed by the walls of the cavity and the walls of pipe 110. Additionally, the fluid may be sealed off from escaping outside distribution block 120 by annular seals such as O-rings 230, which may additionally be said to form part of the boundary of the chamber. As illustrated, in one embodiment, O-rings 230 are fitted on to either end of pipe 110. In various embodiments, any sealer may be used which still allows pipe 110 to twist or slide within distribution block 120. In some embodiments, O-rings 230 may be coupled to grooves in pipe 110; in other embodiments, they may be coupled to grooves in distribution block 120. Accordingly, such sealing devices may or may not be configured to move with pipe 110 as it moves in distribution block 120.

In embodiments in which O-rings 230 move with pipe 110, it may be advantageous to prevent O-rings 230 from slipping outside of distribution block 120. Otherwise, fluid present in the chamber may be allowed to escape. As such, methods for limiting lateral motion 240 as discussed above (i.e., via pipe fittings 210 or creating pipe ends with a larger diameter) may be used to prevent seals from slipping outside distribution block 120.

In embodiments where O-rings 230 do not move with pipe 110, it may be advantageous to prevent aperture 220 from slipping beyond either of O-rings 230. Otherwise, fluid present in the chamber may be allowed to escape. Accordingly, methods for limiting lateral motion 240 may be employed here as well.

Turning now to FIG. 3, a cross-sectional view of a pipe within a distribution block is shown. FIG. 3 includes distribution block 120, pipe fitting 210, pipe 110, cavity 310 and outlet bore 130. As discussed previously, cavity 310 is formed by the outer walls of pipe 110, the inner walls of the cavity in distribution block 120, and O-rings 230. As shown in FIG. 3, a portion of pipe 110 is narrower than the rest of pipe 110, such that the cavity in distribution block 120 is larger in diameter than that portion. Other embodiments may also include pipe 110 having a relatively constant diameter, and simply use a larger version of cavity 310.

Cavity 310 may be sealed at its longitudinal ends by O-rings 230. In certain embodiments, as fluid travels through pipe 110, it may be delivered to outlet bore 130 via aperture 220. In various embodiments, the fluid exits through aperture 220 into cavity 310 prior to being redirected to outlet bore 130. As such, even in the scenarios in which aperture 220 is not directly aligned to outlet bore 130 (e.g., pipe 110 has moved laterally or has twisted) the fluid will still be delivered to outlet bore 130. In this situation, it may be said that outlet bore 130 is "contiguous" to a portion of cavity 310, which will be understood to mean that the two are in fluid communication with each other. For example, cavity 310 may be pressurized via aperture 220, and such pressure may be transmitted to outlet bore 130. Such an arrangement may allow for flow of fluid from cavity 310 through aperture 220 into outlet bore 130.

Figure 4:
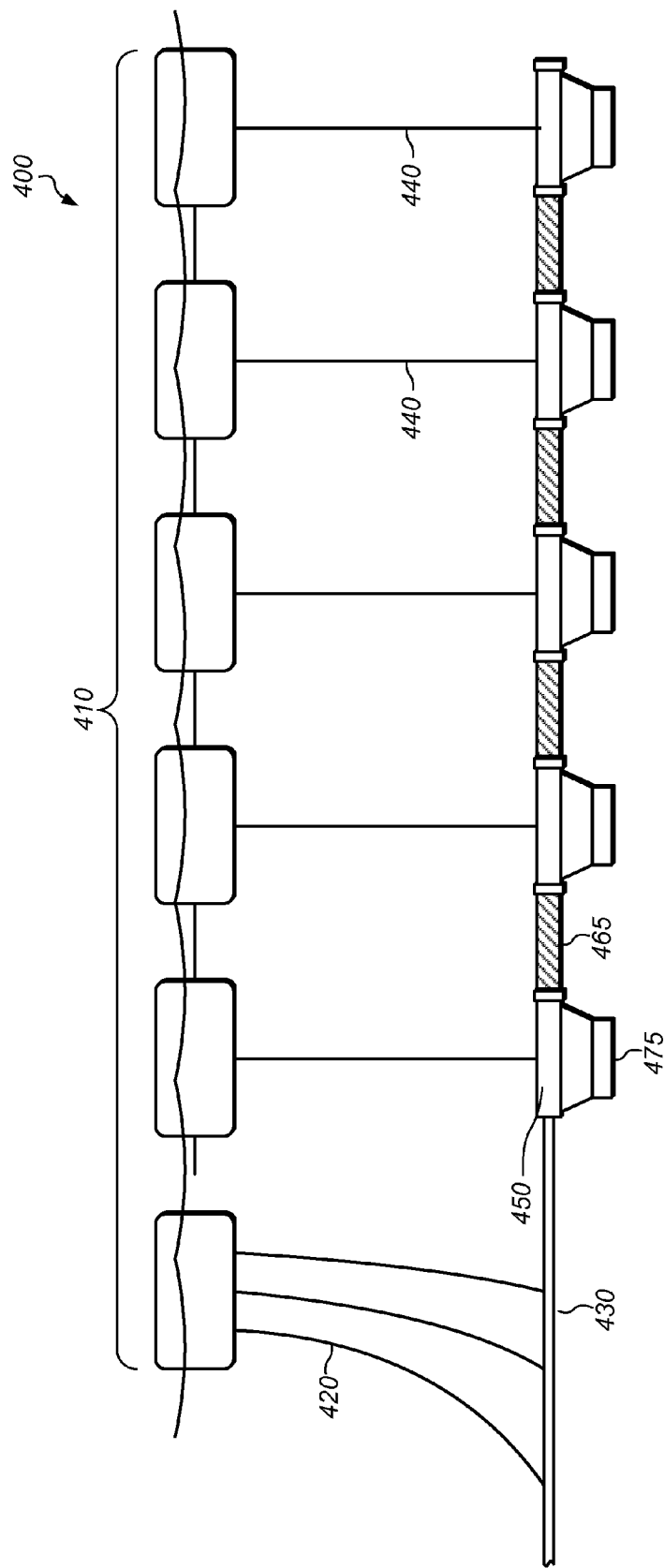
FIG. 4 is an example of a marine seismic source array within which a pipe within a distribution block may be used.

Turning now to FIG. 4, an example of a marine seismic source array according to this disclosure is illustrated. Marine seismic source array 400 includes a plurality of suspension structures 450 and a plurality of seismic sources 475 suspended from float segments 410. One of ordinary skill in the art will recognize that in some embodiments, a single large float or other buoyancy equipment may be used instead of multiple float segments 410. Likewise, a variety of marine seismic source array configurations may be used beyond the illustrated 5-source, linear configuration, including arrays with more or fewer sources, and including arrays wherein the sources are not arranged co-linearly.

Suspension structure 450 may be coupled to float segments 410 via cables 440. In some embodiments, cables 440 may be made of chain, rope, or any other suitable material. Suspension structure 450 contains distribution block 120 (not shown) inside, and suspension structure 450 may be coupled to, e.g., a source of pressurized air on a survey vessel (not shown) via umbilical cable 430 and receive pressurized air therefrom. Umbilical cable 430 may also provide electrical power and signal conductors for actuating seismic sources 475.

Umbilical cable 430 may be coupled to float segments 410 via cables 420. As depicted, float segments 410 are operable to move along the surface of the water while the suspension structures 450 are suspended below the water by cables 440. Seismic sources 475 may be suspended at a desired depth by supplying cables 440 and 420 of a suitable length.

In some embodiments, suspension structures 450 are further coupled to cables 440 by a bracket (not shown). In some embodiments, suspension structures 450 may be connected to each other via flexible connectors 465 (i.e., made of flexible plastic such as polyurethane). These flexible connectors 465 may in some embodiments be referred to as bend strain relief components. In some embodiments, flexible connectors 465 may include molded therein woven fiber or other tension members to enable them to transmit axial loading forces from one suspension structure 450 to another.

As flexible connectors 465 twist and stretch, distribution blocks 120 (not shown) suspended within suspension structures 450 may accept various flexural forces via distribution pipes as shown in FIG. 2 and FIG. 3.

Figure 5:
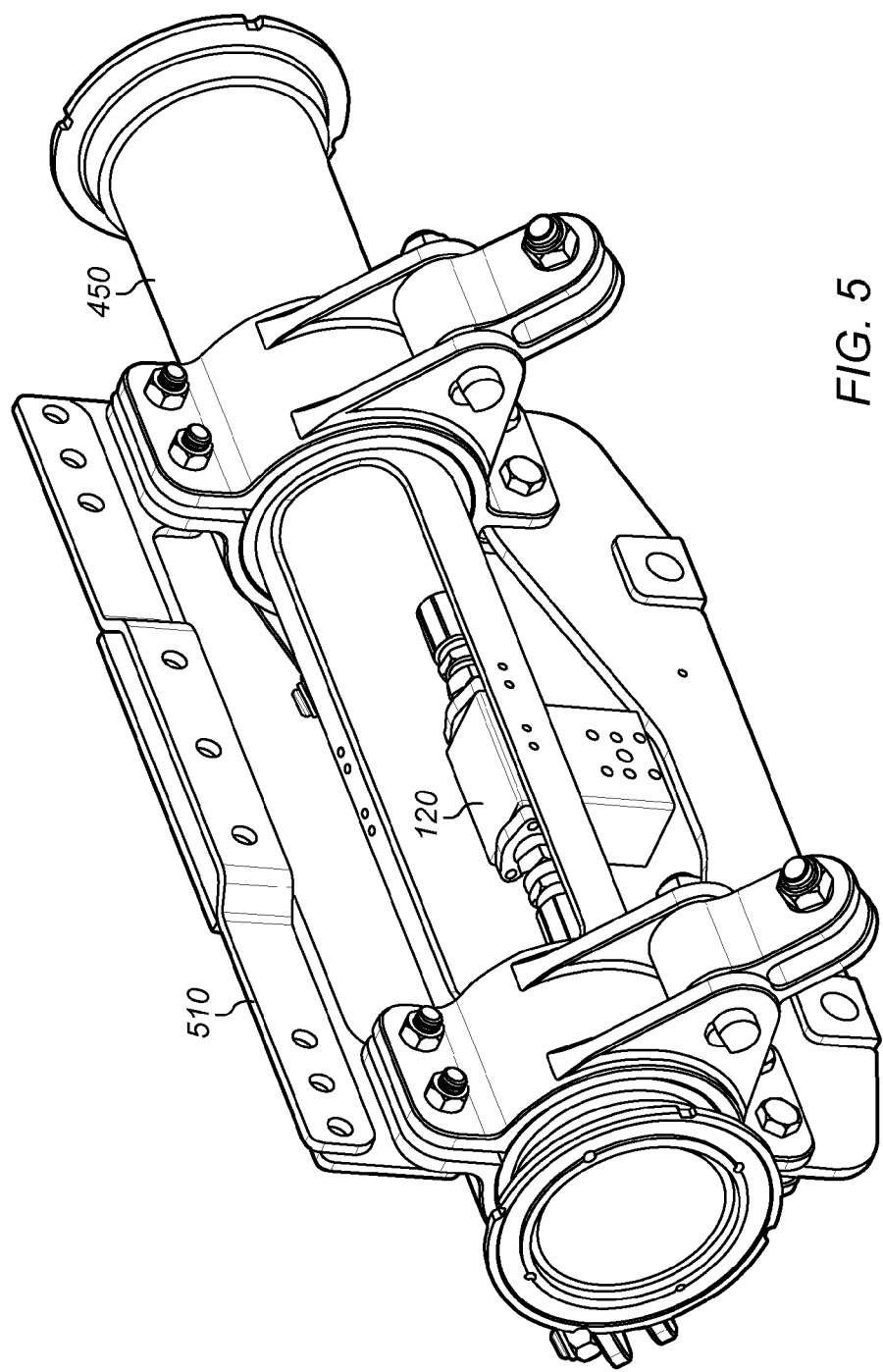
FIG. 5 is an illustration of a distribution block mounted within a suspension structure.

Turning now to FIG. 5, a portion of suspension structure 450 with distribution block 120 mounted within it is illustrated. As mentioned above, in various embodiments, suspension structure 450 is connected to cables (i.e., cables 440) by bracket 510. As illustrated, suspension structure 450 may be a pipe based device. In other embodiments, the suspension structure may be implemented through other means. For example, suspension structure 450 may be any shape (i.e. square, oval, rectangle) and it may be made of rigid or flexible material. Although depicted in FIG. 5 as a pipe, suspension structure 450 may be a plate or any other structure that may be used to construct a frame and provide a housing for distribution block 120. By allowing the distribution pipes within distribution blocks 120 (which are located within suspension structure 450) to rotate and slide in accordance with this disclosure, marine seismic source array 400 may provide increased resistance to wear and breakage.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various embodiments may include some, all, or none of the advantages described herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A fluid distribution apparatus, comprising:
    a distribution block having a cavity extending along a longitudinal axis of the distribution block, wherein a portion of the cavity is contiguous to an outlet bore; and
    a distribution pipe extending through the cavity, wherein the distribution pipe is coupled to respective fittings disposed on either side of the distribution block, and wherein a portion of the distribution pipe located within the cavity includes an aperture;
    wherein the distribution pipe is movable along the longitudinal axis of the distribution block, wherein the respective fittings are positioned to limit an amount of longitudinal movement of the distribution pipe by coming into contact with the distribution block;
    wherein the distribution pipe is rotatable within the distribution block about the longitudinal axis of the distribution block;
    wherein the fluid distribution apparatus is configured to distribute a fluid from the distribution pipe to the outlet bore via the aperture.

2. The fluid distribution apparatus of claim 1, wherein the fluid is air.

3. The fluid distribution apparatus of claim 1, wherein the respective fittings are each connected to a fluid supply hose.

4. The fluid distribution apparatus of claim 2, wherein the outlet bore is connected to a seismic source.

5. The fluid distribution apparatus of claim 1, further comprising a pair of seals disposed on either side of a central portion of the distribution pipe, wherein the central portion includes the aperture and has a cross-section that is smaller than a cross-section of the cavity, forming an inner portion of the cavity that is bounded by the pair of seals and that permits fluid distribution from the distribution pipe to the outlet bore via the aperture.

6. The fluid distribution apparatus of claim 5, wherein the respective fittings are positioned to limit the amount of longitudinal movement of the distribution pipe such that the first pair of seals remain in contact with a portion of the distribution block that bounds the cavity.

7. The fluid distribution apparatus of claim 2, wherein the fluid distribution apparatus is part of a marine seismic source array.

8. An apparatus, comprising:
    a marine survey device, including:
        a distribution conduit; and
        a distribution block having a cavity, wherein the distribution conduit is disposed within and extends lengthwise through the cavity;
    wherein the distribution conduit is positioned to float within the distribution block, permitting the distribution conduit to slide and twist relative to the distribution block;
    wherein the marine survey device is configured to distribute a fluid from the distribution conduit to an output portion of the cavity via an aperture in the distribution conduit.

9. The apparatus of claim 8, further comprising a plurality of seismic sources.

10. The apparatus of claim 9, wherein at least one of the plurality of seismic sources comprises an air gun or a marine vibrator.

11. The apparatus of claim 8, further comprising a pair of bend strain relief supply hoses coupled to respective sides of the distribution conduit.

12. The apparatus of claim 8, further comprising a pair of seals contacting the distribution conduit and the distribution block, wherein the aperture and the output portion of the cavity are positioned between the pair of seals.

13. The apparatus of claim 12, wherein the pair of seals are annular.

14. The apparatus of claim 12, wherein a central portion of the distribution conduit has a reduced cross-section, wherein an outer surface of the central portion of the distribution conduit, the pair of seals, and an inner portion of the distribution block that bounds the cavity between the pair of seals form an inner cavity portion that permits distribution of the fluid from the distribution conduit to the output portion of the cavity via the aperture.

15. The apparatus of claim 13, wherein a pair of restraining structures are disposed on either side of the distribution block, wherein each of the pair of restraining structures has a cross-section that is larger than a cross-section of the cavity, and wherein the pair of restraining structures are positioned to limit a distance that the distribution tube can slide such that each of the pair of seals remains within the distribution block.

16. The apparatus of claim 8, further comprising a plurality of annular structures in contact with the distribution conduit and the distribution block, wherein the plurality of annular structures are disposed on either side of the aperture, forming a chamber that permits distribution of the fluid from the distribution conduit to the output portion of the cavity when the aperture is not aligned with the output portion of the cavity.

17. A marine seismic source array, comprising:
a plurality of seismic sources operable to receive an air supply from a corresponding plurality of air distribution apparatuses, wherein each air distribution apparatus includes:
   a distribution block having a cavity extending along a longitudinal axis thereof, wherein the cavity includes an outlet bore; and
   a distribution pipe extending through the cavity, wherein the distribution pipe is coupled to respective fittings disposed on either side of the distribution block, and wherein a portion of the distribution pipe located within the cavity includes an aperture;
   wherein the distribution pipe is movable along the longitudinal axis of the distribution block, wherein the respective fittings are positioned to limit an amount of longitudinal movement of the distribution pipe by coming into contact with the distribution block;
   wherein the distribution pipe is rotatable within the distribution block about the longitudinal axis of the distribution block; and
a plurality of air hoses connecting the distribution pipes in series via the respective fittings thereof.

18. The apparatus of claim 17, wherein at least one of the plurality of seismic sources comprises an air gun or a marine vibrator.

19. The marine seismic source array of claim 17, wherein at least one of the plurality of air hoses is a flexible air hose.

20. The marine seismic source array of claim 17, further comprising a source air hose connecting a first one of the distribution pipes to a source of pressurized air on a survey vessel.

21. The marine seismic source array of claim 17, wherein the plurality of air distribution apparatuses are coupled to a corresponding plurality of floats.

\* \* \* \* \*